Oct. 23, 1956     W. L. MORRIS     2,767,909
POLYNOMIAL COMPUTER

Filed March 31, 1952     4 Sheets-Sheet 1

INVENTOR.
W. L. MORRIS
BY Hudson & Young
ATTORNEYS

Oct. 23, 1956  W. L. MORRIS  2,767,909
POLYNOMIAL COMPUTER
Filed March 31, 1952  4 Sheets-Sheet 2
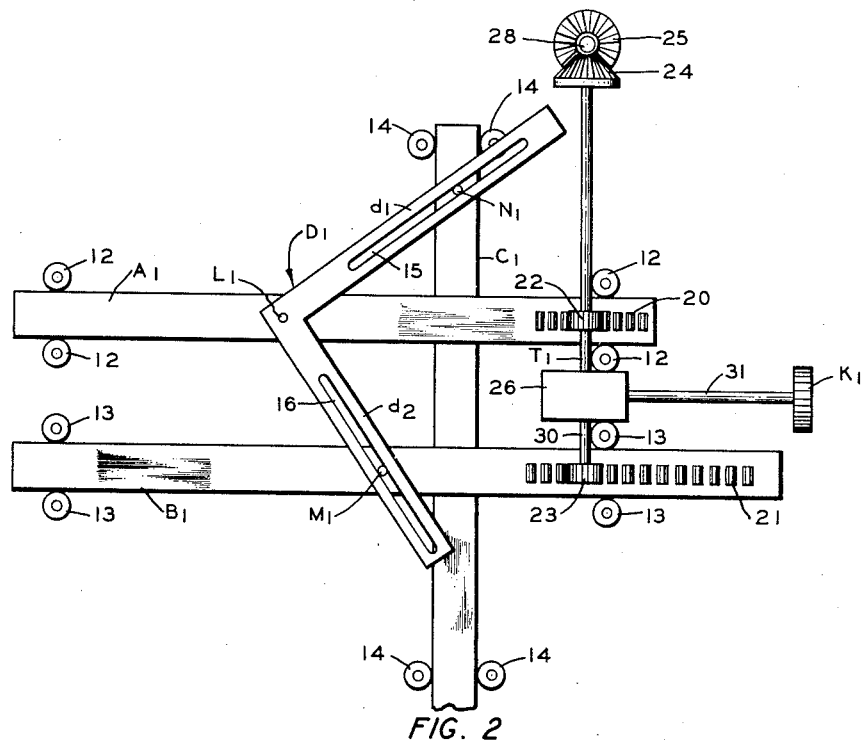
FIG. 2
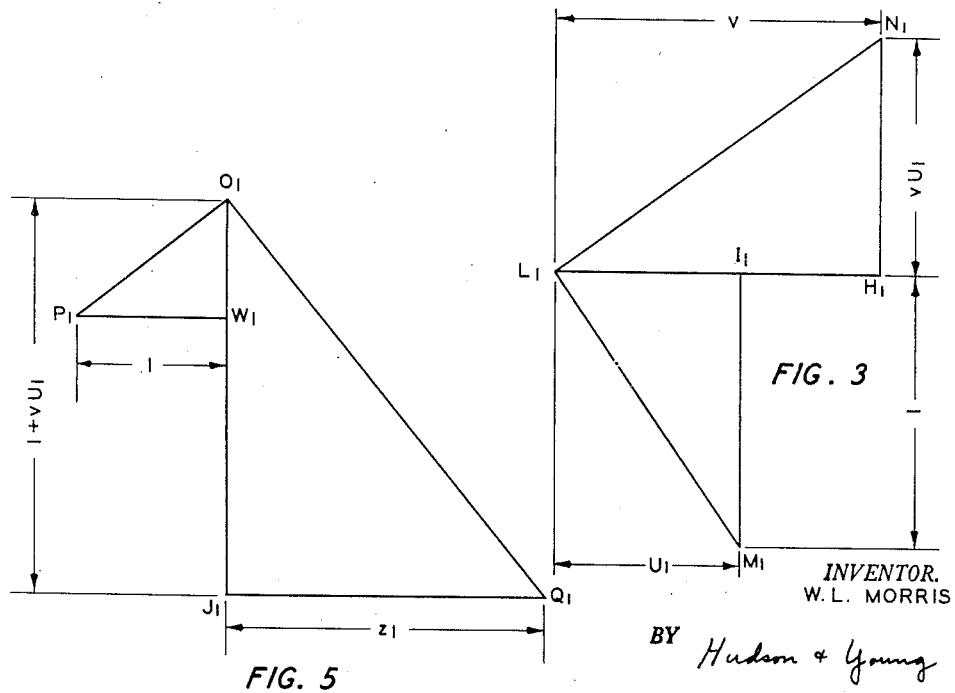
FIG. 5
FIG. 3
INVENTOR.
W. L. MORRIS
BY Hudson & Young
ATTORNEYS Oct. 23, 1956   W. L. MORRIS   2,767,909
POLYNOMIAL COMPUTER
Filed March 31, 1952   4 Sheets-Sheet 3

INVENTOR.
W. L. MORRIS
BY
Hudson & Young
ATTORNEYS

Oct. 23, 1956  W. L. MORRIS  2,767,909
POLYNOMIAL COMPUTER

Filed March 31, 1952  4 Sheets-Sheet 4

INVENTOR.
W. L. MORRIS
BY Hudson & Young
ATTORNEYS

United States Patent Office 2,767,909
Patented Oct. 23, 1956

2,767,909
POLYNOMIAL COMPUTER

William L. Morris, Idaho Falls, Idaho, assignor to Phillips Petroleum Company, a corporation of Delaware Application March 31, 1952, Serial No. 279,543

8 Claims. (Cl. 235—61)

This invention relates to computers. In one specific aspect it relates to mechanical analog computers. In a second specific aspect it relates to computers adapted to solve vapor-liquid equilibrium equations.

In many practical operations of refining, chemical, and other related industries, it often is of considerable importance to determine the composition and amount of liquid and vapor phase in a vapor-liquid equilibrium mixture. In general, the overall composition and total quantity of the mixture are known, from which data the total number of mols in the mixture and the total mol fraction of each component in the mixture may readily be calculated.

With reference to a vapor-liquid mixture containing several components, it is known that by associating with the individual components functional characteristics describing their individual behavior, phase properties of the composite mixture can be predicted by mathematical computation. These characteristics have been termed equilibrium constants and are defined by the general equation:

$$K_i = \frac{y_i}{x_i} \quad (1)$$

where $K$ is the equilibrium constant of the $i$th component which represents available and measurable properties of the individual components of the mixture, $y_i$ is the mol fraction of that component in the vapor phase, and $x_i$ is the corresponding mol fraction in the coexisting liquid phase. In a vapor-liquid mixture containing several components each component does not behave independently of the other components as regards distribution between the gas and liquid vapor. In particular, the following relationships hold for each component in the vapor-liquid mixture:

$$x_i = \frac{z_i}{1+v(K_i-1)} \quad (2)$$

and $$y_i = \frac{K_i z_i}{1+v(K_i-1)} \quad (3)$$

where $x_i$ represents the mol fraction of the $i$th component in the liquid phase, $y_i$ represents the mol fraction of said component in the vapor phase, $v$ is the total mol fraction of vapor in the entire mixture, $z_i$ is the total mol fraction of said component in the entire mixture, and $K_i$ is the equilibrium constant of said component at the temperature and pressure under consideration. The basic unknown in Equations 2 and 3 is $v$, which can be evaluated upon consideration that in a mixture containing several components the sum of the mol fractions in the liquid phase obviously is 1, and, similarly, the sum of the mol fractions in the vapor phase is 1, that is $$x_1 + x_2 + \ldots + x_n = 1 \quad (4)$$

and $$y_1 + y_2 + \ldots + y_n = 1 \quad (5)$$

if there are $n$ components in the mixture. Substituting Equations 4 and 5 in Equations 2 and 3 there are obtained $$\sum_{i=1}^{n} \frac{z_i}{1+v(K_i-1)} = 1 \quad (6)$$

and $$\sum_{i=1}^{n} \frac{K_i z_i}{1+v(K_i-1)} = 1 \quad (7)$$

The computer of the present invention, upon being supplied the equilibrium constant of each component at the temperature and pressure involved and the total mol fraction of each component in the mixture, calculates the known fraction of each component in the liquid phase as well as the total mol fraction of vapor in the entire mixture in accordance with Equation 6. Knowing the mol fractions, the parts by weight or percentage of each component in the vapor and liquid phase easily can be determined if it is necessary to do so.

Accordingly, it is an object of this invention to provide an improved computer capable of solving vapor-liquid equilibrium problems.

It is a further object to provide mechanical calculating units analogous to mathematical equations being solved.

A still further object is to provide a mechanical type computer of simplified rugged construction which is adapted to give rapid reliable results.

Various other objects, advantages and features of this invention should become apparent from the following detailed description of a preferred embodiment thereof taken in conjunction with the accompanying drawing in which:

Figure 2 illustrates the multiplying section of one of the individual computer units;

Figure 3 illustrates the geometric relationship of the multiplier of Figure 2;

Figure 5 illustrates the geometric relationship of the divider of Figure 4;

Figure 1:
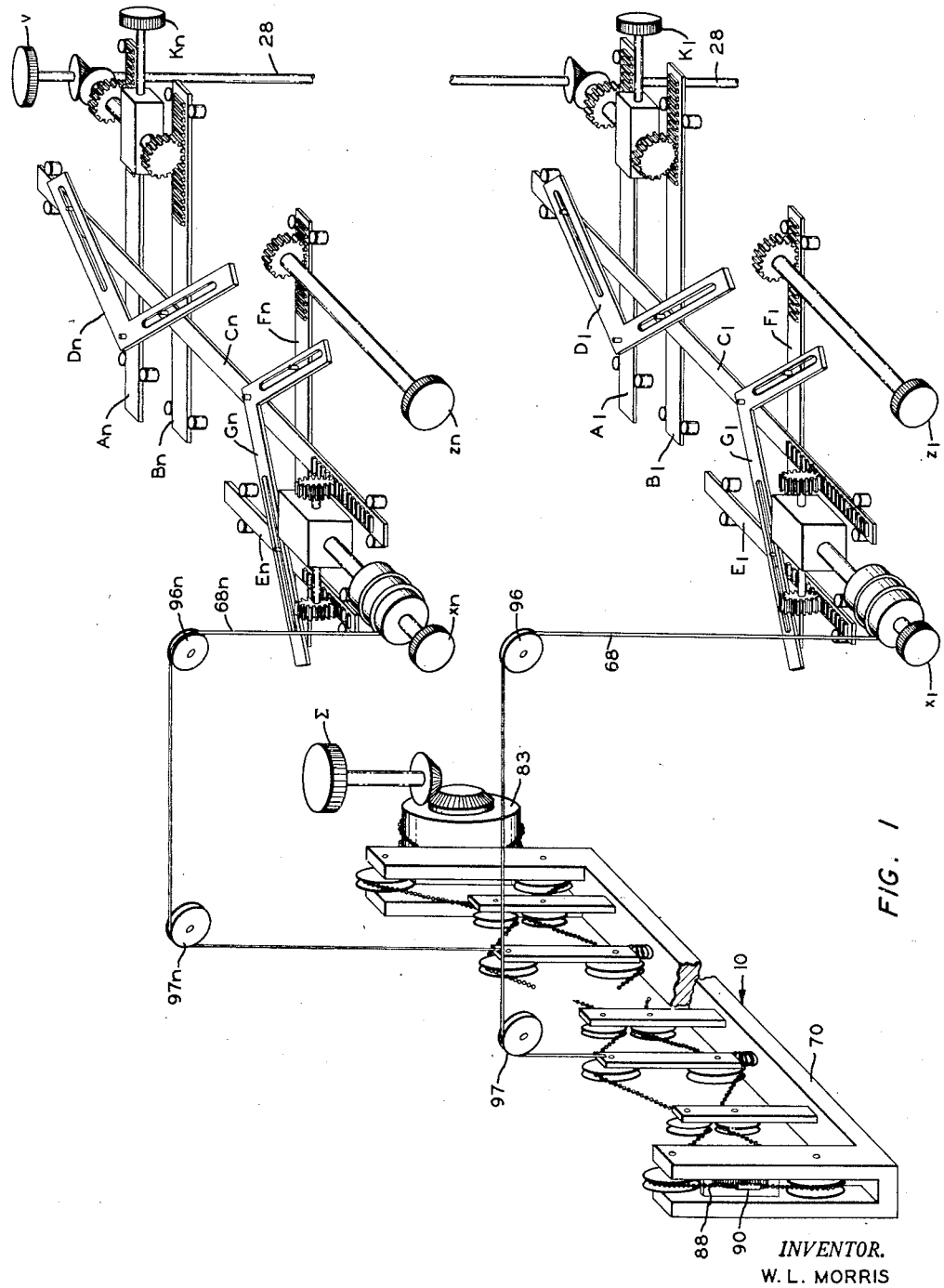
Figure 1 is a schematic representation of the overall computer assembly.

Referring now to the drawing in detail and to Figure 1 in particular, there is shown a schematic representation of the overall computer assembly. In this computer a plurality of $n$ like constructed units are provided, the output of each being intercoupled to summing mechanism illustrated generally at 10. Each of the individual $x_1, \ldots x_n$ units is adapted to provide an output rotation which is proportional to a corresponding $$\frac{z_i}{1+v(K_i-1)}$$

term in the vapor-liquid equilibrium Equation 6, and the sum of these output rotations is obtained by pulley summing unit 10.

In order to simplify the explanation of the operation of the computer of this invention it is convenient to employ a simplified mathematical terminology. Let the following relationships arbitrarily be defined:

$$U_i = K_i - 1 \quad (8)$$

$$S_i = 1 + v(K_i - 1) = 1 + vU_i \quad (9)$$

$$x_i = \frac{z_i}{1 + v(K_i - 1)} = \frac{z_i}{S_i} \quad (10)$$

In view of the foregoing definitions, together with Equations 4 and 6, it should be apparent that a solution to said Equations 4 and 6 can be realized by establishing a first quantity representative of the product $vU_1$, establishing a second quantity representative of the quotient $$\frac{z_i}{S_i}$$

and finally providing a system for adding the $x_1, \ldots x_n$ terms.

The slide multiplier illustrated in Figure 2 is adapted to establish an output translation representative of the product $vU_1$ corresponding to the term $n=1$. Straight bars $A_1$ and $B_1$ are positioned with respect to one another such that their respective longitudinal axes are parallel. Bars $A_1$ and $B_1$ further are constrained for translational movement along their respective longitudinal axes by means of guide rollers 12 and 13, respectively. A third straight bar $C_1$ is positioned such that its longitudinal axis is mutually perpendicular to the parallel longitudinal axes of bars $A_1$ and $B_1$. Bar $C_1$ also is constrained for translational movement along its longitudinal axis by means of rollers 14. A fourth bar $D_1$, having integral arms $d_1$ and $d_2$ at right angles to one another, is pivotally secured to bar $A_1$ by means of a pin $L_1$ positioned at the vertex of the right angle formed between the longitudinal axes of arms $d_1$ and $d_2$ respectively. This pivotal connection between bars $A_1$ and $D_1$ permits bar $D_1$ to rotate about pin $L_1$ on bar $A_1$. Bar arms $d_1$ and $d_2$ are provided with slots 15 and 16, respectively, each of which is located along the longitudinal axis of the respective bar arm. A second pin $M_1$ is fixed to bar $B_1$ at a preselected point on its longitudinal axis, said pin $M_1$ being engaged for slidable movement within slot 16 of bar $D_1$; and a third pin $N_1$ is fixed to bar $C_1$ at a preselected point on its longitudinal axis, said pin $N_1$ being adapted for slidable movement in slot 15 of bar $D_1$.

In order to establish the multiplication factors $v$ and $U_1$ on bars $A_1$ and $B_1$, gear racks 20 and 21 are provided near the right end portions of and integral with said respective bars, said gear racks being adapted to receive pinion gears 22 and 23, respectively. Secured to pinion gear 22 is an input shaft $T_1$ which is rotated by means of bevel gears 24, 25, which in turn connect shaft $T_1$ with a common input shaft 28. Shaft 28 serves to impart identical rotations to each of the $T_1, \ldots T_n$ shafts of the respective $x_1, \ldots x_n$ units. A dial $v$, see in Figure 1, is mounted on shaft 28 to indicate the rotation thereof. Pinion gears 22 and 23 each are connected to a differential gear 26 by means of shafts $T_1$ and 30, respectively. A third shaft 31 is also connected to differential gear 26, and is supplied with a dial $K_1$ to indicate the rotation of said shaft 31.

Figure 6:
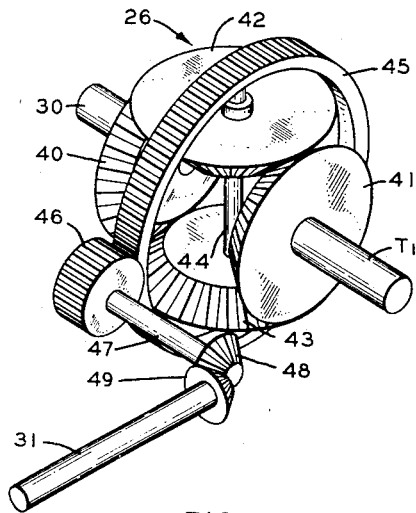
Figure 6 illustrates a suitable differential gear which is employed in the computer assembly.
Figure 10:
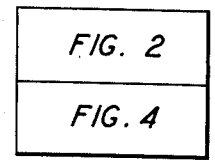
Figure 10 illustrates the arrangement of parts of Figures 2 and 4.

A suitable differential gear 26 is illustrated in Figure 6. Opposing bevel gears 40 and 41 are mounted rigidly on shafts 30 and $T_1$, respectively, said shafts 30 and $T_1$ each being positioned for independent rotation about a common axial line. A second pair of opposing bevel gears 42 and 43 are positioned between gears 40 and 41 in arrangement such as to mesh therewith, said gears 42 and 43 being free to rotate about a common shaft 44, the axis of which is perpendicular to the common axis of shafts 30 and $T_1$. In this manner the gear unit 42, 43 is free to rotate about the common axis of shafts 30 and $T_1$. A spur gear 45 surrounds gear unit 42, 43 and is rigidly connected thereto at each end of shaft 44. A spur gear 46, rigidly secured to shaft 47, meshes with gear 45, while bevel gears 48 and 49 serve to connect shafts 47 and 31.

The operation of the slide unit shown in Figure 2 to perform the desired multiplication $vU_1$ takes place in the following manner. Let it be assumed that shafts 28, $T_1$, rotate pinion 22 by an amount such that pin $L_1$ is positioned at a distance representative of $v$ units to the left of the longitudinal axis of bar $C_1$. By construction, bars $A_1$ and $B_1$ are positioned relative to one another such that the distance between their respective longitudinal axes is representative of unity. The shaft rotation $T_1$, representative of $v$ also is applied to differential gear 26 so as to constitute one input thereof. The second input to differential gear 26 is supplied through shaft 31 which is rotated by an amount representative of the factor $U_1$. The output of differential gear 26, through shaft 30 to pinion 23, is equal to the difference between the inputs applied through shafts $T_1$ and 31 as described in greater detail in the following paragraph. The net result of the output from differential gear 26 being applied to bar $B_1$ through pinion 23 and rack 21 is such as to provide a translation of said bar $B_1$ which is representative of the quantity $v - U_1$. This last mentioned translation moves bar $B_1$ until pin $M_1$ is $U_1$ units to the right of point $L_1$, said distance being measured along the longitudinal axis of bar $B_1$.

Figure 7A:
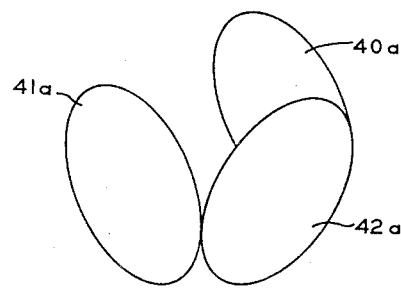
Figures 7a and 7b illustrate operation of the differential gear.
Figure 7B:
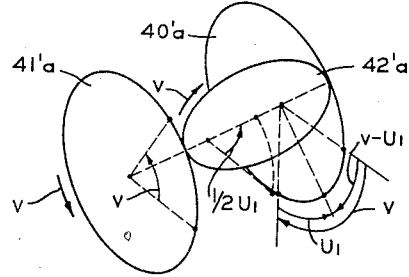

Geometrically, the motion of the bevel gears of differential gear 26 is equivalent to the motion of non slipping right circular cones or frustums of cones. For simplicity of explanation each of said gears can be replaced by a disk tangent to the other disks, each of said disks representing a cross-section of the cone taken perpendicular to its axis. These disks, of course, must rotate without slipping. In Figure 7a, gears 41, 40, and 42 are represented by disks 41a, 40a, and 42a, respectively. Let it be assumed that disk 41a is given a rotation representative of $v$ in the direction indicated in Figure 7b, and that the disk unit 42a subsequently is given a rotation representative of $\tfrac{1}{2}U_1$, also in the direction indicated. The final positions of the gears of differential unit 26 are illustrated by the disk arrangement in Figure 7b. The rotation $v$ of disk 41a imparts a rotation $v$ to disk 42a (assuming spur gear 45 does not rotate), which in turn imparts a rotation $v$ to disk 40a in the opposite direction to the rotation of disk 41a. The rotation $\tfrac{1}{2}U_1$ of the center of disk 42a imparts a rotation $U_1$ to a point on the periphery of said disk (assuming disk 41a does not rotate) which in turn imparts a second rotation $U_1$ to disk 40a. As illustrated, rotations $v$ and $U_1$ of disk 40a are in opposite directions, thereby resulting in a net rotation of disks 40a equal to $v - U_1$. Suitable gear ratios between bevel gears 48, 49 and spur gears 45, 46 provide a rotation of $\tfrac{1}{2}U_1$ units to gear unit 42, 43 when an input rotation $U_1$ is supplied by shaft 31.

Referring now to Figure 3 there is illustrated the geometric configuration of the slide multiplier of Figure 2. The point of intersection of the longitudinal axes of bars $A_1$ and $C_1$ is designated as $H_1$. By drawing a vertical line from pin $M_1$ to bar $A_1$, and designating the intersection thereof as $I_1$, it should be apparent that two similar triangles, triangle $L_1N_1H_1$ and triangle $M_1L_1I_1$, are formed since angle $N_1L_1M_1$ is a right angle as are angles $L_1H_1N_1$ and $M_1I_1L_1$. Because corresponding sides of similar triangles are proportional to one another the following relationship is evident:

$$\frac{H_1N_1}{I_1L_1} = \frac{H_1L_1}{I_1M_1} \quad (11)$$

from which $$H_1N_1 = \frac{(I_1L_1)(H_1L_1)}{I_1M_1} \quad (12)$$

Since from the drawing it is apparent that $I_1L_1$ equals $U_1$, $H_1L_1$ equals $v$, and $I_1M_1$ equals unity, it follows that $H_1N_1$ equals the product $vU_1$. From this it can be seen that the total resulting displacement of pin $N_1$ from the longitudinal axis of bar $B_1$ is equal to $1+U_1$, which forms the denominator of the $n=1$ term of the vapor-liquid equilibrium Equation 6 as modified by definition 8.

Figure 4:
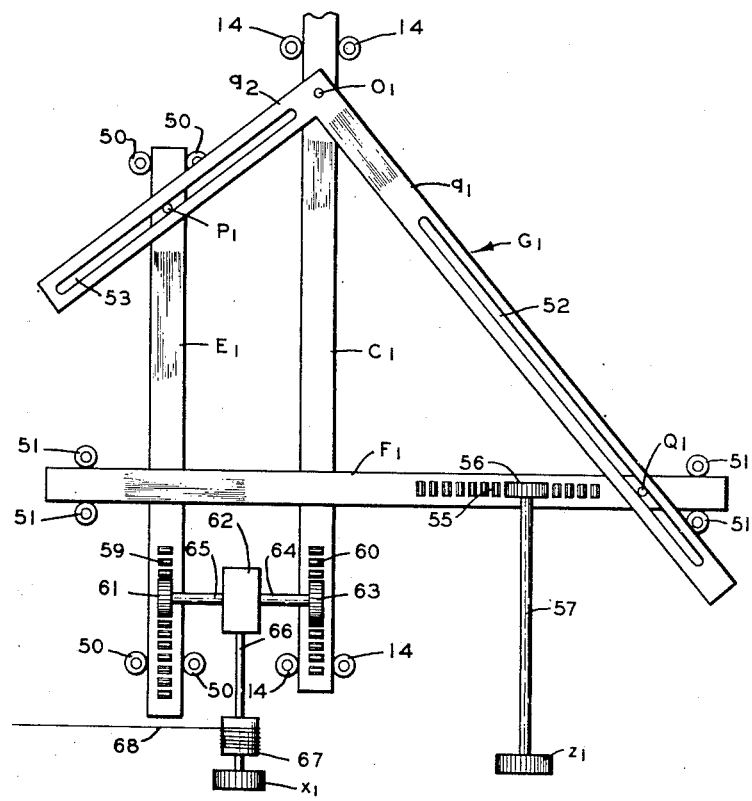
Figure 4 illustrates the dividing section of one of the individual computer units.

In Figure 4 there is shown the section of the individual $n=1$ computer unit which is adapted to provide the quotient $$\frac{z_1}{S_1}$$

This unit also comprises a pair of straight bars $E_1$ and $C_1$ positioned such that their respective longitudinal axes are in parallel relationship with one another. Bar $E_1$ is constrained for translational movement along its longitudinal axis by means of rollers 50, while bar $C_1$ is constrained for translational movement along its longitudinal axis by additional rollers such as 14. From Figure 1 it can be seen that the portion of bar $C_1$ illustrated in Figure 4 is merely a continuation of bar $C_1$ as shown in Figure 2. A third straight bar $F_1$ is positioned such that its longitudinal axis is mutually perpendicular to the longitudinal axes of bars $C_1$ and $E_1$. Bar $F_1$ is constrained for movement along its longitudinal axis by means of guide rollers such as 51. A fourth bar, $G_1$, having integral arms $g_1$ and $g_2$ disposed at right angles to one another, is pivotally pinned to bar $C_1$ by means of a pin $O_1$ fixed at the vertex of the right angle formed between the longitudinal axes of said arms $g_1$ and $g_2$, respectively. This pivotal connection between bars $C_1$ and $G_1$ permits bar $G_1$ to rotate about said pivot pin $O_1$ on bar $C_1$. Bar arms $g_1$ and $g_2$ are provided with slots 52 and 53, respectively, each of which is located along the longitudinal axis of the respective arm of bar $G_1$. A second pin $P_1$ is secured to bar $E_1$ at a preselected point on its longitudinal axis, said pin being adapted for slidable movement within slot 53 of bar $G_1$; and a third pin $Q_1$ is fixed to bar $F_1$ at a preselected point on its longitudinal axis, said pin $Q_1$ being adapted for slidable movement within slot 52 of bar $G_1$.

A gear rack 55 is formed near the right end of bar $F_1$ and a pinion gear 56 is provided in engagement with said rack 55. Pinion gear 56 in turn is rotated by means of shaft 57 having a dial $z_1$ connected thereto to indicate the rotation of shaft 57.ABr racks 59 and 60 are formed near the lower ends of bars $E_1$ and $C_1$, respectively. Pinion gears 61 and 63 are positioned for engagement with racks 59 and 60, respectively; each being connected to a differential gear 62 by means of shafts 65 and 64, respectively. The output of differential gear 62 is applied through shaft 66 to a drum 67 mounted thereon and having a dial $x_1$ associated therewith. A cable 68 is attached to drum 67 in a manner so that rotation of drum 67 winds or unwinds cable 68 thereon depending upon the direction of rotation of said drum.

The construction of the dividing unit illustrated in Figure 4 is such that pin $O_1$ assumes a position $1+vU_1$ units from the longitudinal axis of bar $F_1$ in accordance with the multiplication performed by that portion of the $n=1$ computer unit illustrated in Figure 2. Bars $C_1$ and $E_1$ are positioned with respect to one another such that the distance between their respective longitudinal axes is equal to unity. Shaft 57 is rotated to impart a translation through pinion 56 and rack 55 to bar $F_1$, this translation being of magnitude such that pin $Q_1$ is moved $z_1$ units to the right of the longitudinal axis of bar $C_1$.

In Figure 5 the geometric configuration of the slide divider of Figure 4 is illustrated. The intersection of the longitudinal axes of bars $C_1$ and $F_1$ is designated by $J_1$. A horizontal line is drawn from pin $P_1$ to bar $C_1$ and the intersection thereof is designated by $W_1$. It should be apparent that two similar triangles, triangle $P_1W_1O_1$ and triangle $O_1J_1Q_1$, are formed since angle $P_1O_1Q_1$ is a right angle as are angles $P_1W_1O_1$ and $O_1J_1Q_1$. Again, because corresponding sides of similar triangles are proportional the following relationship is evident:

$$\frac{W_1O_1}{J_1Q_1}=\frac{W_1P_1}{J_1O_1} \qquad (13)$$

from which $$W_1O_1=\frac{(J_1Q_1)(W_1P_1)}{J_1O_1} \qquad (14)$$

Since by Figure 5 $W_1P_1$ equals unity, $J_1Q_1$ equals $z_1$ and $J_1O_1$ equals $1+vU_1$, it follows that $W_1O_1$ is equal to the quotient $$\frac{z_1}{S_1}$$

From this it can be seen that pin $P_1$ assumes a position equal to $$\frac{z_1}{S_1}$$

units from pin $O_1$, this distance being measured along the longitudinal axis of bar $C_1$. This translation of bar $E_1$ in turn causes a rotational input through rack 59, pinion 61, and shaft 65 to differential gear 62. The second input to differential gear 62 is through rack 60, pinion 63, and shaft 64; this second input being equal to the translation of bar $C_1$. As described in detail in the following paragraph the output of differential gear 62 is equal to the difference between the two rotational inputs, that is, the output rotation of shaft 66 is equal to shaft rotation 64 minus shaft rotation 63, which is equal to:

$$S_1-\left(S_1-\frac{z_1}{S_1}\right)=\frac{z_1}{S_1}=\frac{z_1}{1+v(K_1-1)}=x_1 \qquad (15)$$

It should, therefore, be apparent that the output rotation of shaft 66 is of magnitude proportional to the $x_1$ term in Equation 6 as modified by definition 8. This output rotation of shaft 66 is transmitted by means of attached cable 68 so as to constitute one of the inputs to summing mechanism 10.

Figure 8A:
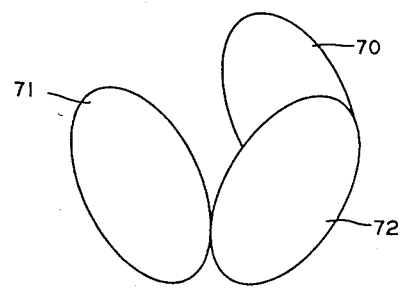
Figures 8a and 8b illustrate a second mode of operation of the differential gear.
Figure 8B:
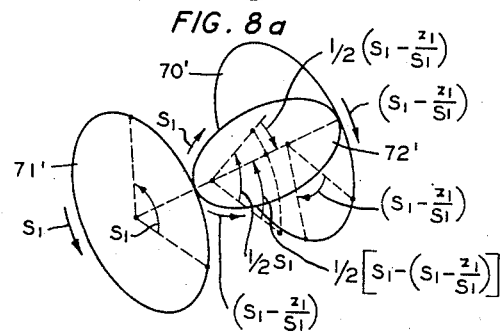

Differential gear 62 is of construction similar to gear 26 as shown in Figure 6. The operation of differential gear 62 is illustrated in Figures 8a and 8b which are analogous to Figures 7a and 7b. Let it be assumed that disk 71 is rotated by shaft 64 by an amount representative of $S_1$ in the direction indicated, and that disk 70 is rotated by shaft 65 by an amount representative of $$\left(S_1-\frac{z_1}{S_1}\right)$$

also in the direction indicated. The rotation $S_1$ of disk 71 imparts a rotation equal to ½ $S_1$ to the center of disk 72, while the rotation of disk 70 imparts a rotation equal to $$\frac{1}{2}\left(S_1-\frac{z_1}{S_1}\right)$$

to the center of disk 72, these two rotations of the center of disk 72 being in opposite directions. From this it should be evident that the net output rotation of the center of disk 72 is equal to $$\frac{1}{2}\left[S_1-\left(S_1-\frac{z_1}{S_1}\right)\right] \text{ or } \frac{1}{2}\frac{z_1}{S_1}$$

The rotation of the center of disk 72, which corresponds to gear unit 42, 43 in Figure 6, is applied to shaft 66 by means of suitable linkage similar to spur gears 45, 46, shaft 47, and bevel gears 48, 49 of differential gear 26. By suitable ratios of these linkage gears the output rotation of shaft 66 is made equal to the quotient $$\frac{z_1}{S_1}$$

Figure 9:
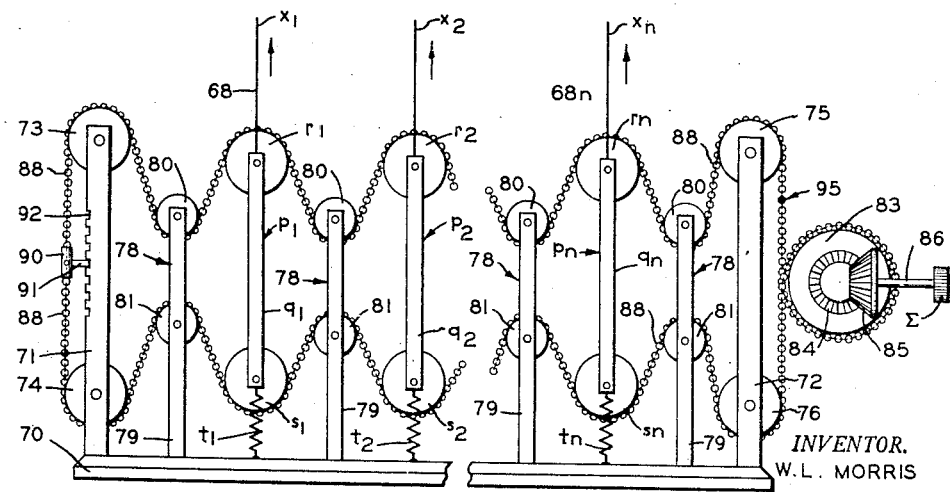
Figure 9 shows the adding section of the overall computer.

From the foregoing discussion it can be seen that the combined multiplying and dividing unit illustrated in Figures 2 and 4 is adapted to provide an output rotation which is representative of the $x_1$ term of Equation 6. As shown in Figure 1, the overall computer comprises $n$ multiplying and dividing units, each of which is identical in construction and operation to the $n=1$ unit above described. The remaining problem in the solution of Equation 6, therefore, is to provide means for summing the individual $x_n$ terms provided by the $n$ multiplying and dividing units. This is accomplished by means of the pulley summing apparatus 10 illustrated in Figure 9.

Summing apparatus 10 comprises a frame 70 adapted to support a plurality of pulley units, and is provided with integral upright positioned end members 71 and 72 adapted to support a pair of spaced rotatable pulleys such as 73, 74 and 75, 76, respectively. A plurality of $n$ pulley units $p_1$, $p_2$, . . . $p_n$ is positioned between end members 71 and 72. Each of said pulley units $p_1$, $p_2$, . . . $p_n$ includes a rigid support bar such as $q_1$ having rotatable pulleys $r_1$ and $s_1$ attached near the respective ends thereof. The lower end of bar $q_1$ is secured to frame 70 by means of a tension spring $t_1$, while the upper end of said bar $q_1$ is connected to a cable such as 68, which in turn represents the output rotation of a corresponding dividing unit. Interposed between each of said adjacent pulley units $p_1$, $p_2$, . . . $p_n$, between unit $p_1$ and end member 71, and between unit $p_n$ and end member 72 is a second pulley unit 78. Pulley units 78 each include a rigid support bar 78 attached at one end to frame 70 and having rotatable pulleys 80 and 81 fixed thereto in spaced relationship. The distance between each pair of pulleys 80 and 81 is less than the distance between each pair of pulleys such as $r_n$ and $s_n$. A rotatable drum 83 is mounted adjacent end member 72 of frame 70. Drum 83 is provided with a bevel gear 84 which meshes with a second bevel gear 85 attached to shaft 86 and dial $\Sigma$. A cable 88 is wound around drum 83 several times to prevent slippage therebetween; and the first end of cable 83 then passes over pulley 75, under the adjacent pulley 80, over pulley $r_n$, etc., and finally under the pulley 80 adjacent member 71 and over pulley 73. The second end of cable 88 passes under pulley 76, over the adjacent pulley 81, under pulley $s_n$, etc., and finally over the pulley 81 adjacent member 71 and under pulley 74. The two ends of cable 88 are united by a turnbuckle 90 which is provided with clamping means 91 for selective attachment along the edge 92 of member 71.

In operation of summing unit 10, turnbuckle 90 is tightened to prevent sagging in the resulting endless cable 88. For purposes of explanation reference is made to a given point 95 on cable 88 adjacent member 72. It should be evident that if pulley unit $p_1$ is given an upward displacement of $x_1$ units, point 95 will be moved upward by an amount equal to $2x_1$ units due to the fact that cable 88 passes both over pulley $r_1$ and under pulley $s_1$. In like manner if pulley unit $p_n$ is given an upward displacement of $x_n$ units, point 95 will receive an additional $2x_n$ units upward displacement. Therefore, the total displacement of point 95, which is equivalent to the rotation of drum 83, is representative of twice the summation of the individual displacements $x_1$, $x_2$, . . . $x_n$ applied to unit 10. By suitable calibration of dial $\Sigma$, $$\sum_{i=1}^{n} x_i$$

can be obtained directly. Clamping means 91 provide for adjustment of the initial position of drum 83.

The overall assembly of the computer of this invention is illustrated in Figure 1. A plurality of $n$ like constructed combination multiplying and dividing units are positioned adjacent one another and intercoupled by means of the common input shaft 28 which provides the input rotation to the $A_i$ bar in each of the units. The output rotation $x_1$ of each of the units is applied to a corresponding pulley unit $p_1$ of summing unit 10 by means of a cable such as 68 which passes over suitable guide pulleys such as 96 and 97.

The operation of the overall computer takes place in the following manner. The values of the equilibrium constants $K_1$ are set on corresponding $K_1$ dials for each component. As previously described, dial $K_1$ is adapted to provide an input rotation to differential gear 26 which is proportional to $U_1$, $U_1$ having been defined as equal to $K_1-1$. However, by suitable calibration of each of the respective $K_1$ dials, the actual values of $K_1$ can be inserted directly thereon. The corresponding $z_1$ values for each component in the equilibrium mixture are inserted on corresponding $z_1$ dials. Common input shaft 28 then is rotated until the summation of the individual $x_1$ output rotations is numerically equal to unity as indicated upon dial $\Sigma$ of summing unit 10. Under this condition Equation 4 is satisfied and the corresponding value of $v$ is obtained from the reading of dial $v$. The individual values of $x_1$ in turn are obtained directly from the corresponding dials $x_1$ in each unit. If it is desired to compute the individual values of $y_i$, such computation readily can be accomplished by a simple multiplication in view of Equation 1 since $y_i = K_i x_i$.

From the foregoing discussion it should be apparent that the objects of this invention have been accomplished by means of the mechanical computing device herein described. While this description has been of a present preferred embodiment of the invention, it should be apparent to those skilled in the art that various modifications can be made without departing from the scope thereof. It is, therefore, my intention not to be limited to the precise embodiment herein described. It further should be apparent that while the description of this computer has been made in conjunction with vapor-liquid equilibrium problems, the computer is equally well adapted for the solution of any equation of the same general form.

Having described my invention, I claim:

1. A computer for evaluating $v$ in an equation of the general form $$\sum_{i=1}^{n} \frac{z_i}{1+vU_i} = w$$

where $n$ is a positive integer greater than unity and $z_i$, $v$, $U_i$ and $w$ are quantities of known magnitude, comprising in combination, $n$ like constructed slide multiplying means each adapted to provide an output translation of a first member representative of a term $1+vU_i$ for respective $i$ values when supplied with input translations representative of $v$ and respective $U_i$ values, $n$ like constructed slide dividing means each adapted to provide an output translation of a second member representative of a term $$\frac{z_i}{1+vU_i}$$

when supplied with input translations representative of respective $z_i$ and $1+vU_i$ values, said $1+vU_i$ values being the respective output translations of said $n$ slide multiplying means, means for providing displacement of a third member representative of the summation of the output translations of said slide dividing means, and means for adjusting by like amounts the input translations representative of $v$ in each of said first slide multiplying means until said summation displacement is representative of $w$.

2. The combination in accordance with claim 1 wherein said summation means comprises $n$ like constructed pulley units, each pulley unit including a pair of pulleys mounted on a common support member at a fixed distance from one another, said support members being connected at one end to the respective outputs of said slide dividing means and resiliently connected at the other end to a common base, an endless cable passing about said $n$ pulley units and contacting each of said individual pulleys, said cable being rigidly secured at a first fixed reference point, a plurality of fixed guide supports disposed between said pulley units such that said cable passes about at least one of said guide supports between each pair of adjacent pulleys, and means for indicating the displacement of a second reference point on said cable responsive to variations in output of said slide multiplying means.

3. A computer for evaluating $v$ in an equation of the general form $$\sum_{i=1}^{n} \frac{z_i}{1+vU_i} = 1$$

where $n$ is a positive integer greater than unity and $z_i$, $v$ and $U_i$ are quantities of known magnitude, comprising in combination; $n$ like constructed slide multiplier units, each adapted to provide an output translation representative of a term $1+vU_i$ for respective $i$ values comprising first and second straight bars disposed in parallel relationship with one another and constrained for translational movement along the respective longitudinal axes, said first and second bars being positioned unity distance from one another, a third straight bar disposed mutually perpendicular to said first and second bars, said third bar also being constrained for translational movement along its longitudinal axis, a right angle bar attached at its vertex at a first point on the longitudinal axis of said first bar, said right angle bar being adapted for rotation about said first point, a first guide member fixed at a second point on the longitudinal axis of said second bar, said first guide member being disposed for slidable engagement with one arm of said right angle bar, a second guide member fixed at a third point on the longitudinal axis of said third bar, said second guide member being positioned such that said first bar is maintained between said second bar and said first guide member, said second guide member being disposed for slidable engagement with the second arm of said right angle bar, means for positioning said first bar such that the vertex of said right angle bar is $v$ units from the longitudinal axis of said third bar, and means for positioning said second bar such that said first guide member is U units from the vertex of said right angle, said U units being measured along the longitudinal axis of said second bar, whereby said third bar is translated such that said second guide member is $1+vU$ units from the longitudinal axis of said second bar; $n$ like constructed slide divider units, each adapted to provide an output translation representative of a term $$\frac{z_i}{1+vU_i}$$

for respective $i$ values comprising fourth and fifth straight bars disposed in parallel relationship with one another and constrained for translational movement along their respective longitudinal axes, said fourth bars being extensions of respective said first bars, said fourth and fifth bars being positioned unity distance from one another, a sixth straight bar disposed mutually perpendicular to said fourth and fifth bars, said sixth bar also being constrained for translational movement along its longitudinal axis, a second right angle bar attached at its vertex to a fourth point on the longitudinal axis of said fourth bar, said second right angle bar being adapted for rotation about said fourth point, a third guide member fixed at a fifth point on the longitudinal axis of said fifth bar, said third guide member being disposed for slidable engagement with one arm of said second right angle bar, a fourth guide member fixed at a sixth point on the longitudinal axis of said sixth bar, said fourth guide member being disposed for slidable engagement with the second arm of said second right angle bar, said respective first and second end units being disposed such that the vertex of said second right angle bar is $1+vU_i$ units from the longitudinal axis of said sixth bar, and means for positioning said sixth bar such that said fourth guide member is $z_i$ units from the longitudinal axis of said fourth bar, whereby said fifth bar is translated such that said third guide member is $$\frac{z_i}{1+vU_i}$$

units from the vertex of said second right angle bar, said $$\frac{z_i}{1+vU_i}$$

units being measured along the longitudinal axis of said fourth bar; means for providing a displacement representative of the summation of the translations of the fifth bars of said end dividing units; and means for adjusting by like amounts the positions of the first bars in each of said $n$ multiplying units until said summation displacement is representative of unity.

4. A computer for evaluating $v$ in an equation of the general form $$\sum_{i=1}^{n} \frac{z_i}{1+vU_i} = 1$$

where $n$ is a positive integer greater than unity and $z_i$, $v$ and $U_i$ are quantities of known magnitude, comprising in combination; $n$ like constructed slide multiplier units, each adapted to provide an output translation representative of a term $1+vU_i$ for respective $i$ values comprising first and second straight bars disposed in parallel relationship with one another and constrained for translational movement along their respective longitudinal axes, said first and second bars being positioned unity distance from one another, a third straight bar disposed mutually perpendicular to said first and second bars, said third bar also being constrained for translational movement along its longitudinal axis, a right angle bar pinned at its vertex to a first point on the longitudinal axis of said first bar, said right angle bar being adapted for rotation about said first point, a second pin fixed at a second point on the longitudinal axis of said second bar, said second pin being disposed in slidable engagement with a slot formed in one arm of said right angle bar along the longitudinal axis thereof, a third pin fixed at a third point on the longitudinal axis of said third bar, said third pin being disposed in slidable engagement with a slot formed in the second arm of said right angle bar along the longitudinal axis thereof, said third pin being positioned such that said first bar is maintained between said second bar and said third pin, means for positioning said first bar such that the pinned vertex of said right angle bar is $v$ units from the longitudinal axis of said third bar, and means for positioning said second bar such that said second pin is U units from said pinned vertex, said U units being measured along the longitudinal axis of said second bar, whereby said third bar is translated such that said third pin is $1+vU$ units from the longitudinal axis of said second bar; $n$ like constructed slide divider units, each adapted to provide an output translation representative of a term $$\frac{z_i}{1+vU_i}$$

for respective $i$ values comprising fourth and fifth straight bars disposed in parallel relationship with one another and constrained for translational movement along their respective longitudinal axes, said fourth bars being extensions of respective said first bars, said fourth and fifth bars being positioned unity distance from one another, a sixth straight bar disposed mutually perpendicular to said fourth and fifth bars, said sixth bar also being constrained for translational movement along its longitudinal axis, a second right angle bar pinned at its vertex to a fourth point on the longitudinal axis of said fourth bar, said second right angle bar being adapted for rotation about said fourth point, a fifth pin fixed at a fifth point on the longitudinal axis of said fifth bar, said fifth pin being disposed in slidable engagement with a slot formed in one arm of said second right angle bar along the longitudinal axis thereof, a sixth pin fixed at a sixth point on the longitudinal axis of said sixth bar, said sixth pin being disposed in slidable engagement with a slot formed in the second arm of said second right angle bar along the longitudinal axis thereof, said respective first and second $n$ units being disposed such that the pinned vertex of said second right angle bar is $1+vU_i$ units from the longitudinal axis of said sixth bar, and means for positioning said sixth bar such that said sixth pin is $z_i$ units from the longitudinal axis of said fourth bar, whereby said fifth bar is translated such that said fifth pin is $$\frac{z_i}{1+vU_i}$$

units from said fourth pin, said $$\frac{z_i}{1+vU_i}$$

units being measured along the longitudinal axis of said fourth bar; means for providing a displacement representative of the summation of the translations of the fifth bars of said $n$ dividing units; and means for adjusting by like amounts the positions of the first bars in each of said $n$ multiplying units until said summation displacement is representative of unity.

5. The combination in accordance with claim 4 wherein said summation means comprises $n$ like constructed pulley units, each unit including a pair of pulleys mounted on a common support member at a fixed distance from one another, means for resiliently connecting one end of each of said support members to a common base and means for connecting the other end of each of said support members to respect fifth bars of said dividing units, whereby said pulley units are displaced from said base by amounts representative of respective $$\frac{z_i}{1+vU_i}$$

values, an endless cable passing about said $n$ pulley units and contacting each of said individual pulleys, said cable being rigidly secured at a first fixed reference point, a plurality of fixed guide supports disposed between said pulley units such that said cable passes about at least one of said guide supports between each pair of adjacent pulleys, and means for indicating the displacement of a second reference point on said cable responsive to variations of the translations of said fifth bars.

6. The combination in accordance with claim 4 wherein said last mentioned means comprises $n$ racks positioned on respective said $n$ first bars, $n$ pinions adapted to engage respective said $n$ racks, means adapted to rotate by like amounts each of said $n$ pinions, and means for indicating the degree of rotation of said $n$ pinions, said rotation being representative of $v$.

7. The combination in accordance with claim 6 wherein said $n$ multiplier units each includes a second rack positioned on said second bar, a second pinion adapted to engage said second rack, and a first differential gear unit, the output of which rotates said second pinion, said differential gear unit being supplied with a first input rotation from the pinion engaging said first bar and a second input rotation representative of a respective $U_i$ value, whereby the output rotation of said first gear unit is representative of a respective $v-U_i$ value; and wherein said $n$ divider units each includes a sixth rack positioned on said sixth bar, a sixth pinion adapted to engage said sixth rack, means for rotating said sixth pinion by an amount representative of a respective $z_i$ value, fourth and fifth racks positioned on said fourth and fifth bars respectively, fourth and fifth pinions adapted to engage said fourth and fifth racks respectively, a second differential gear unit, said second gear unit being supplied with the rotation of said fourth pinion representative of respective $1+vU_i$ values and with the rotation of said fifth pinion representative of respective $$1+vU_i-\frac{z}{1+vU_i}$$

values, whereby the output rotation of said second gear unit is representative of respective $$\frac{z}{1+vU_i}$$

values.

8. The combination in accordance with claim 7 wherein said summation means comprises $n$ like constructed pulley units, each unit including a pair of pulleys mounted on a common support member at a fixed distance from one another, means for resiliently connecting one end of each of said support members to a common base and means for connecting the other end of each of said supports to the outputs of respective second differential gear units, an endless cable passing about said $n$ pulley units and contacting each of said individual pulleys, said cable being rigidly secured at a first fixed reference point, a plurality of fixed guide supports disposed between said pulley units such that said cable passes about at least one of said guide supports between each pair of adjacent pulleys, and means for indicating the displacement of a second reference point on said cable.

References Cited in the file of this patent

UNITED STATES PATENTS

| | | |
|---|---|---|
| 1,482,152 | Ross | Jan. 29, 1924 |
| 1,892,183 | Gorrie | Dec. 27, 1932 |
| 1,953,328 | Woolley | Apr. 3, 1934 |
| 1,971,238 | Silling | Aug. 21, 1934 |
| 2,045,621 | Spitzglass et al. | June 30, 1936 |
| 2,369,420 | Thurston et al. | Feb. 13, 1945 |
| 2,444,549 | Anderson | July 6, 1948 |
| 2,448,596 | Imm | Sept. 7, 1948 |
| 2,472,097 | Doersam | June 7, 1949 |
| 2,481,648 | Dehn | Sept. 13, 1949 |
| 2,498,310 | Svoboda | Feb. 21, 1950 |
| 2,498,311 | Svoboda | Feb. 21, 1950 |

FOREIGN PATENTS

| | | |
|---|---|---|
| 498,999 | Great Britain | Jan. 17, 1939 |

OTHER REFERENCES

Computing Mechanisms and Linkages by Svoboda, McGraw-Hill, 1948. Book contains 359 pages, pertinent Figure 1–11, pp. 2, 3, 13, 14, 40, 41.